DIGITAL DATA TRANSMISSION SYSTEM HAVING MEANS FOR AUTOMATICALLY DETERMINING THE TYPES OF PERIPHERAL UNITS COMMUNICATING WITH THE SYSTEM

Filed March 27, 1967

3 Sheets-Sheet 1

May 5, 1970 J. R. BENNETT ET AL 3,510,843

DIGITAL DATA TRANSMISSION SYSTEM HAVING MEANS FOR AUTOMATICALLY DETERMINING THE TYPES OF PERIPHERAL UNITS COMMUNICATING WITH THE SYSTEM

Filed March 27, 1967

3 Sheets-Sheet 2

INVENTORS.
JAMES RUSSELL BENNETT
ROBERT D. HEWITT

BY Christie, Parker & Hale

ATTORNEYS

May 5, 1970 J. R. BENNETT ET AL 3,510,843

DIGITAL DATA TRANSMISSION SYSTEM HAVING MEANS FOR AUTOMATICALLY DETERMINING THE TYPES OF PERIPHERAL UNITS COMMUNICATING WITH THE SYSTEM

Filed March 27, 1967 3 Sheets-Sheet 3

3,510,843

DIGITAL DATA TRANSMISSION SYSTEM HAVING MEANS FOR AUTOMATICALLY DETERMINING THE TYPES OF PERIPHERAL UNITS COMMUNICATING WITH THE SYSTEM

James Russell Bennett, Glendora, and Robert D. Hewitt, Whittier, Calif., assignors to Burroughs Corporation, Detroit, Mich., a corporation of Michigan Filed Mar. 27, 1967, Ser. No. 626,064
Int. Cl. G06f 7/00
U.S. Cl. 340—172.5 2 Claims

ABSTRACT OF THE DISCLOSURE

A digital data transmission system in which identification signals presented by line adapters associated with respective ones of a plurality of different types of input-output units are utilized to present to main memory of the system result descriptor words which identify the types of input-out units communicating with the system. The result descriptor words are formulated in response to commands presented to the input-output control units.

BACKGROUND OF THE INVENTION

This invention relates to data communication systems and more particularly to such systems in which programmatic test routines must know the types of peripheral units communicating with the system.

Computer systems in which the main memory of the computer is time-shared by one or more processing units and by a plurality of peripheral devices have become well-known in recent years. In such systems, the central control unit allocates requests for accesses to the main memory made by processors and by the peripheral devices. By operating in such a manner, many processing and input-output operations may be executed simultaneously. Consequently, many users may operate the computer simultaneously, or apparently simultaneously, in such a way that each is, or may be, completely unaware of the use being made of the computer by others. Additionally, a number of programs may be executed such that none needs to be completed before another is started or continued. Where several independent processors are utilized in the system, each may have access to a common main memory of the system.

In systems of the type described in the preceding paragraph, the central control unit of the system allocates accesses to main memory which are requested by the various devices. A device having access to the memory during any given memory cycle need not, and probably will not, have access to the memory during the immediately succeeding memory cycle. Thus during successive memory cycles, the memory may be utilized in conjunction with entirely unrelated operations. The device which receives access to memory at any given time is determined on the basis of decisions made by the central control unit which thereby achieves optimum usage of the main memory and assures that all simultaneously performed operations will be executed, insofar as possible, on a basis such that each of the operations is unaware that others are also being executed.

Transmission of data over long distances via commercially available transmission lines has long been known. Such transmission may occur, for example, over the Bell System telephone network, over the TWX network, the Telex network, or over leased lines. Recently, the transmission of data over such data communication lines has been made directly communicable with computer systems. Thus, a computer system may transmit data via data communication lines directly to, or receive data from, a terminal unit which may be several thousand miles away.

The various input-output units utilized in a computer system having a time-shared main memory ordinarily communicate with the central control unit of the system via a plurality of input-output control units and a plurality of input-output channels. Each input-output unit will often have an individal control unit and an individual input-output channel associated with it. When a large number of data communication lines must communicate with the central control unit, it is often uneconomic to provide an individual control unit and input-output unit for each line. Since the transmission of data over the communication lines is relatively slow, it is possible to provide a single multi-line input-output control unit for all of the data communication lines. Data transmitted over all of the lines is thereby funnelled into a single input-output channel between the multi-line control unit and the central control unit.

Each data communication line is coupled to the multi-line control unit via a line adapter. The line adapters enable input-output units of different types to be connected to the same multi-line control unit. Among other functions, they provide a common interface between the input-output units and the multi-line control unit.

Control circuitry within the multi-line control unit must respond to signals provided by a line adapter which manifest characteristics of the particular type of input-output unit associated with that adapter. Thus, for example, the signals will designate whether the particular input-output unit transmits characters with the most significant bit first or the least significant bit first; the number of bits per character; whether horizontal parity is used; whether vertical parity is used; whether even or odd parity is used; whether transmission is synchronous or asynchronous; etc. Logic circuitry must be provided within the control unit which responds to these signals and causes the entire multi-line control unit to behave in a proper manner to control transmission of data between the computer and the input-output unit associated with the particular line adapter.

In computer systems of the type generally described above, it frequently is necessary to apply programmatic test routines to the input-output units communicating with the system. Each different type of input-output unit normally calls for a different test routine and the test routines may conveniently be stored in the main memory and accessed by the computer software.

In order to select the proper test routine, the software must be informed of the type of input-output units associated with particular single line input-output control units and of the types of units associated with particular line locations within particular multi-line control units. Heretofore such information was generally entered by a user either manually into a table in main memory by means of a console or by means of configuration subsystem characteristic punched cards. These methods of telling the test routines what type units are to be tested take an amount of time to set up which is not readily available. Additionally mistakes could easily occur during the entry of these parameters into memory with the result that the user is subsequently given false indications of error conditions during the subsequent executions of the test routines.

An advantage of the present invention is that it provides a data communication system in which a substantial saving of time is achieved in the storing in memory of information identifying the types of input-output units communicating with the system.

Another advantage of the present invention is that it provides a data communication system in which information identifying the types of input-output units communicating with the system need not be entered into memory by the user.

A further advantage of the present invention is that it provides a data communication system in which information identifying the types of input-output units communicating with the system is entered into memory by means of signals provided by line adapters associated respectively with the input-output units themselves.

Another advantage of the present invention is that it provides an improved data communication system.

SUMMARY OF THE INVENTION

In brief, the preceding and additional advantages are achieved in a system similar to that described in the copending patent application of James Russell Bennett, Ser. No. 626,013 filed on even date herewith and assigned to the assignee of the present invention. Means are provided whereby identification signals from line adapters associated with respective ones of the input-output units are used to formulate result descriptor words which identify the types of input-output units communicating with the system. These words are subsequently stored in reserved locations in main memory and are then utilized to select the proper test routines to be applied to particular ones of the input-output units.

Software within the system initially causes the processor to execute an "initiate input-output" command which opens up a designated input-output channel and identifies the address of an "input-output identity test" command. Subsequently the processor fetches this last-mentioned command and its execution is then turned over to the input-output control unit associated with the designated channel. A single-line control unit uses signals from the line adapter associated with its input-output unit to assemble a result descriptor which identifies the type of input-output unit on the line. When completed this result descriptor is stored in memory as a channel result descriptor and subsequently transferred by the software to a predetermined table location in memory. If the designated channel has a multi-line input-output unit associated therewith the "input-output identity test" command will designate the particular input-output unit with respect to which the command is to be executed. The multi-line control unit uses signals from the line adapter associated with the particular input-output unit to assemble the result descriptor. This result descriptor is then stored in memory and then may be transferred by the software to a predetermined table location in memory.

BRIEF DESCRIPTION OF THE DRAWING

The manner of operation of the present invention and the manner in which it achieves the above and other advantages may be more clearly understood by reference to the following detailed descriptions when considered with the drawing in which.

DETAILED DESCRIPTION

Figure 1:
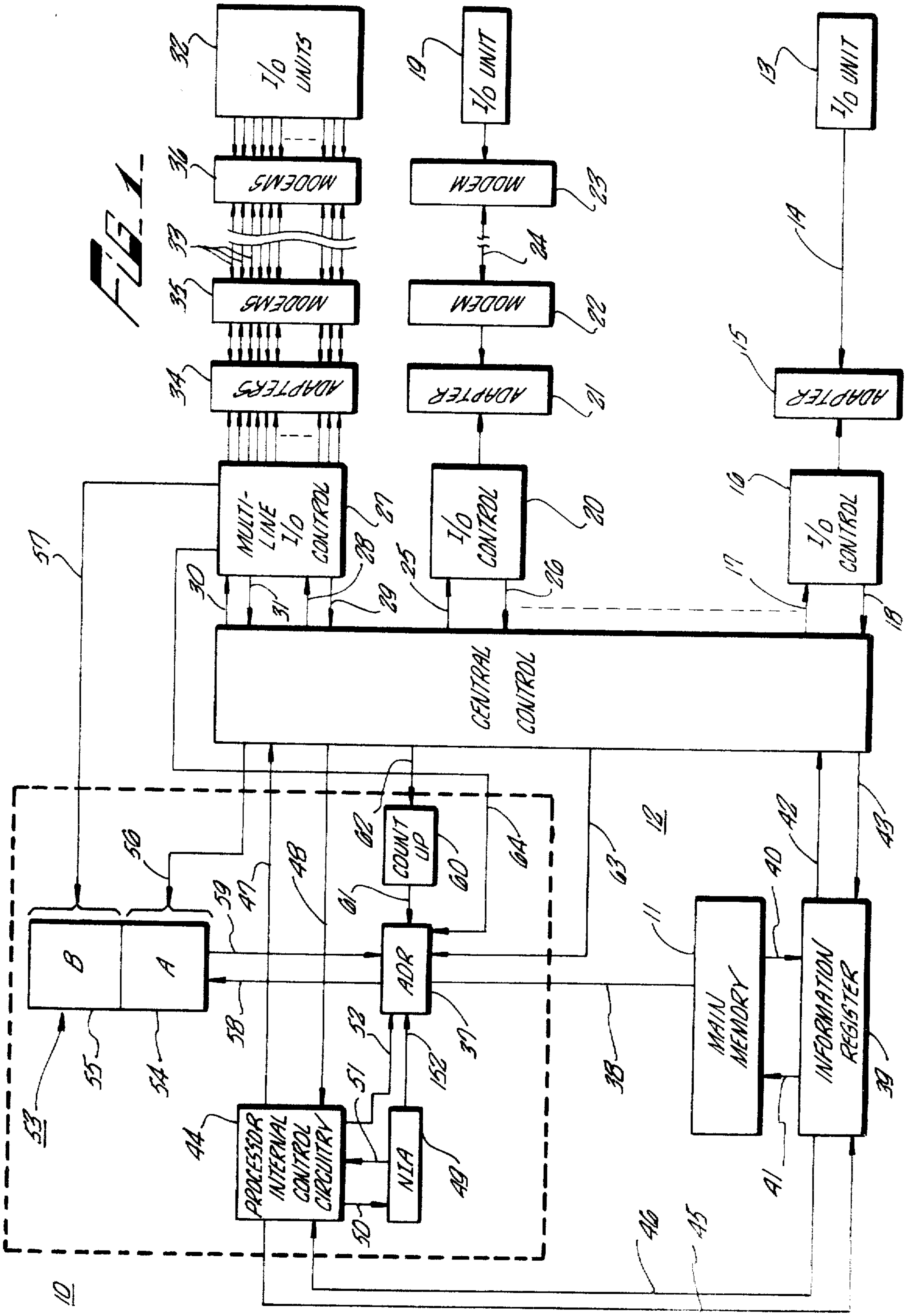
FIG. 1 depicts a block diagram of a computer system which utilizes the present invention.

FIG. 1 depicts a computer system of the type described in the aforesaid application of James Russell Bennett. It depicts central processing unit 10, main memory 11, and central control unit 12. Main memory 11 is time-shared by processor 10 and a plurality of input-output units. Access to memory 11 by the processor and the input-output units is controlled by the central control unit 12. Consequently, a plurality of input-output operations may proceed simultaneously and many users may thereby utilize this system simultaneously in such a way that each can be completely unaware of the use of the system being made by others. Whenever the processor or any of the input-output units desire access to memory 11 they indicate this desire by transmitting a signal to central control unit 12. The central control unit 12 then handles these requests for memory requests for memory access and allocates memory accesses to the processor and the input-output units. Central control unit 12 has a fixed number of input-output channels, each of which is reserved for a single input-output control unit. The unit 12 may be considered for purposes of description herein to have twenty such input-output channels. Input-output unit 13 is connected to a first input-output channel of control unit 12 via line 14, line adapter 15, and input-output control unit 16. The first input-output channel is indicated by lines 17 and 18. Although lines 17 and 18 are shown in FIG. 1 as single lines for the purposes of clarity, as are other lines depicted in the drawing, in actuality many lines will be utilized to transmit signals over the indicated paths. Input-output unit 12 is shown connected to the eighteenth input-output channel by input-output control unit 20, line adapter 21, modulator-demodulators 22 and 23 (hereinafter referred to as modems), and data communication line 24. The eighteenth input-output channel is indicated by lines 25 and 26. The modems may be standard telephone data sets, such as the Bell System 202D Data Set referred to in Pat. 3,407,-387. Such data sets are available from the telephone companies for transmitting binary information over standard telephone line equipment.

Some input-output units which must communicate with central control unit 12 are much slower than others with respect to their speed of operation. The allocation of a separate input-output channel to central control unit 12 for each such slow-speed unit would be uneconomic. Transmission of data over data communication lines, for example, is relatively slow compared to the rate of transmission between a computer system and input-output units connected directly thereto. In FIG. 1 a multi-line input-output control unit 27 is utilized to connect a plurality of such data communication lines to central control unit 12 by means of only two input-output channels. These two input-output channels, the nineteenth and twentieth of central control unit 12, are indicated by the lines 28 and 29 and by the lines 30 and 31 respectively.

For the purpose of description herein the multi-line input-output control unit 27 will be considered to be connected to thirty-six input-output units 32, shown in FIG. 1 as a single block for purposes of illustration, via data communication lines 33. The nineteenth input-output channel is utilized to transmit commands between control unit 12 and multi-line control unit 27, while the twentieth input-output channel is utilized to transmit data between these control units. Data transmitted between the computer system and the thirty-six input-output units 32 connected to multi-line control unit 27 via the data communication lines 33 is thus funnelled to a single input-output channel connecting input-output control unit 27 and central control unit 12. As a result, the total number of input-output units which may be serviced by central control unit 12 has been increased from twenty to fifty-four.

Line adapters 34 are connected between the multi-line input-output control unit 27 and the data communication lines 33. There will be a separate line adapter for each of the data communication lines, although for the sake of illustration they also are shown in FIG. 1 as a single block. Additionally two modems 35 and 36 will be utilized in conjunction with each of the data communication lines 33. The modems also are shown as single blocks and are stationed at opposite ends of each of the data communication lines. One modem modulates digital data prior to its transmission over the data communication line while the other modem demodulates the modulated signals received over the data communication lines. Such modems are available for example through the American Telephone and Telegraph Company. Thus with respect to each input-output unit 32 connected to multi-line input-output control unit 27 there will be a line adapter 34 adjacent the unit 27, a first modem 35 adjacent the line adapter 34, a second modem 36 adjacent the input-output unit, and a data communication line 33 joining the two modems.

Within the central processing unit 10 is address register 37. Address register 37 is utilized to address main memory 11 via line 38. Information is read from memory 11 into information register 39 via line 40 and is written into memory 11 from register 39 via line 41. Register 39 is connected to central control unit 12 via lines 42 and 43 and to control circuitry 44 within processor 10 via lines 45 and 46. Control circuitry 44 is connected to central control unit 12 by lines 47 and 48, to Next Instruction Address register 49 within processor 10 by lines 50 and 51, and to address register 37 by line 52. Register 49 contains the address of the next instruction to be executed by processor 10 under the supervision of software within the system. Register 49 is connected to address register 37 by line 152. Also within processor 10 is address memory 53. Address memory 53 comprises a section 54 and a section 55 which will hereafter sometimes be referred to as the A and B sections respectively of the address memory 53. Address memory 53 may advantageously be made up of a number of cards containing intergrated transistor storage devices. Although address memory 53 is made up of such integrated circuitry, it operates in the manner of a word organized core memory.

Section A of address memory 53 is addressed via line 56 by central control unit 12 only. Section A of address memory 53 has two word locations reserved therein for each of the twenty input-output channels which connect central control unit 12 with the input-output control units and additional word locations reserved therein for use by the processor itself. Section B of address memory 53 is addressed via line 57 by the multi-line control unit 27 only. Section B has two word locations reserved therein for each of the thirty-six input-output units serviced by multi-line control unit 27. Address register 37 serves as an information register for address memory 53 as well as an address register for memory 11. Addresses in main memory 11 are written into address memory 53 from register 37 via line 58 and are read from memory 53 into register 37 via line 59. The storing of addresses in the memory and transferring these addresses to the address register of the main memory is described in more detail in U.S. Pat. 3,359,544.

When information is written into or read from memory 11 during any given memory cycle the contents of address register 37 will ordinarily be counted up by circuitry 60 via line 61 prior to the next succeeding memory cycle. The counting up operation is under the control of central control unit 12 via line 62 connecting control unit 12 and count-up circuitry 60. For purposes of description herein memory 11 will be assumed to store individually addressable four-bit digits. It will further be assumed however that these digits will automatically be written into and read from memory 11 two digits at a time. Thus during each memory cycle count-up circuitry 60 will ordinarily increase the contents of address register 37 by two.

During the operation of the system shown in FIG. 1 input-output commands are transferred two digits at a time to the input-output control unit of the input-output unit to which they relate and to reserved locations within address memory 53. After such a command has been received in full, a channel descriptor word is stored in memory 11 at a predetermined location therein thereby designating that the complete command has been received. The address to which this descriptor word is to be stored is set into register 37 from central control unit 12 via line 63. When the input-output command relates to one of the input-output units associated with the multi-line control unit 27, the channel descriptor word stored in memory 11 via line 43 and the nineteenth input-output channel indicates that the nineteenth channel is again free to receive an input-output command directed to a different one of the input-output units associated with multi-line control unit 27. When a particular input-output command has been executed by the multi-line control unit 27, a second descriptor word is stored in memory 11 from multi-line control unit 27 via line 43 at an address in memory 11 set into register 37 via line 64 connected between control unit 27 and address register 37. The freeing of the nineteenth input-output channel after an input-output command has been fully received, even though the command has not yet been executed, enables the nineteenth input-output channel to receive a second input-output command while the first is being executed by control unit 27. Similarly additional input-output commands relating to other ones of the input-output units associated with control unit 27 may be received via the nineteenth input-output channel while several previously received commands are in the process of being executed by control unit 27.

The line adapters 34 enable input-output units of different types to be connected to the same multi-line input-output control unit. These line adapters provide a common interface between each of the input-output units 32 and the multi-line control unit 27. Additionally, they change the electrical and logical levels of signals provided by modems 35 and transform these signals into signals which are compatible with multi-line control unit 27. They also provide a timing function whereby they accommodate different clock rates required by the input-output units to the multi-line control unit 27. Furthermore, they provide bit-handling circuitry and control circuitry whereby a bit may be temporarily stored and additionally provide logic circuitry for controlling the modems 35. Line adapters of this type are well known and have been designed to operate with various different types of input-output units. Suitable line adapters are described, for example, in U.S. Pat. 3,390,379.

During the operation of the system depicted in FIG. 1 the central control unit 12 allocates accesses to main memory 11 requested by the processor via the eighteen input-output units associated with the first eighteen input-output channels and by the thirty-six input-output units 32 associated with the nineteenth and twentieth input-output channels via multi-line control unit 27. All of these fifty-five devices may operate simultaneously such that each is virtually unaware of the fact that memory 11 is also being accessed by the other devices. Thus while only one of the devices will have access to memory 11 during any given memory cycle, any of the other devices may be allocated access to the memory during the immediately succeeding memory cycle. It is the central control unit 12 which determines which of the devices has access to memory 11 during any given memory cycle.

If, for example, the processor wishes to execute the next command in a program which it is in the midst of executing, the address of this next command will be stored in Next Instruction Address register 49. This address is transferred to address register 37 via line 152. During a first memory cycle granted to the processor the first two digits of the command are read out of memory 11 into information register 39 and thence transferred via line 46 to processor control circuitry 44. At the end of this memory cycle the contents of register 37 are counted up by two by the counting circuitry 60 and the new contents of address register 37 are stored in a word location in section A of address memory 53 which is reserved for the processor. By having granted memory access to the processor during the memory cycle just discussed, the central control unit 12 automatically addressed a word location in address memory 53 reserved for the processor. Thus at the end of the memory cycle granted to the processor the address of the next section of the command which the processor desires to execute has been stored in a location in section A of address memory 53 which is reserved for the processor. When the processor is next granted access to memory 11 the address of the next section of the processor command is read from this location in section A of address memory 53 into address register 37. The remainder of the command is fetched by the processor in a similar manner and the processor then commences to execute the command.

The fetch of a data word proceeds in a manner identical to the fetch of an instruction word. Processor requests for memory access may be transmitted to central control unit 12 via line 47 while grants of access to the processor may be transmitted to processor control circuitry 44 via line 48.

Requests for memory access by the input-output units proceed in a manner similar to that described for the processor. Thus for example if input-output unit 13 requests a memory access, this request will be transmitted via input-output control unit 16 and line 18 of the first input-output channel to central control unit 12. When memory access is granted to this input-output unit by central control unit 12 the central control unit 12 automatically addresses that location in section A of address memory 53 which is reserved for the first input-output channel. Consequently when the input-output control unit 16 is in the midst of transferring data between input-output unit 13 and memory 11, this data will be transferred via register 39 and lines 42 and 43 into or from the addresses in memory 11 specified by the contents of a word location in section A of memory 53 reserved for the first input-output channel. Time sharing of a computer main memory 11 between a processor and input-output units such as units 13 and 19 by means of central control unit 12 and input-output control units 16 and 20 is known and will not be described at length herein. Such a modular computer system is described, for example, in U.S. Pat. 3,200,380.

The extension of such time sharing to a plurality of input-output units controlled by a single multi-line input-output control unit has heretofore presented certain difficulties which, as described in a copending application of James Russell Bennett and Roger E. Packard, Ser. No. 626,176, filed on even date herewith, and assigned to the assignee of the present invention, are eliminated by the use of section B of address memory 53. Section B of address memory 53 is not addressed by central control unit 12 as is section A but rather is addressed solely by the multi-line control unit 27 itself. This section of address memory 53 is addressed by multi-line input-output control unit 27 via line 57. When a particular one of the input-output units 32 desires access to memory 11 this request is transmitted via multi-line input-output control unit 27 to the central control unit 12. When memory access is granted for this request by control unit 12, data characters may be transferred between the particular one of the input-output units 32 and a predetermined address in memory 11 reserved for this particular one of the input-output units 32 via information register 39. The predetermined address within memory 11 is selected by means of an address word stored in a location within section B of address memory 53 which is reserved for the particular one of the input-output units 32 which has requested access. This reserved location within section B of address memory 53 is itself addressed by means of line 57 from multi-line input-output control unit 27. Such use of section B of address memory 53 enables successive data characters received from a particular one of the input-output units 32 to be stored in adjacent locations within memory 11 despite the fact that many other characters from other ones of the input-output units 32 may have been received intermediate the characters from the particular one of the input-output units 32. If a particular one of the input-output units 32 is in the process of transmitting data characters to particular locations in memory 11 and a character from this input-output unit is received by multi-line control unit 27, central control unit 12 is requested to grant an access to memory 11. When this request is granted, multi-line control unit 27 will address via line 57 a word in section B of address memory 53 reserved for the particular one of the input-output units 32 and an address word will be read out into address register 37. The character received will be transmitted via the twentieth input-output channel and information register 39 into the address in memory 11 specified by the word now stored in address register 37. The contents of address register 37 will then be counted up by two by circuitry 60 and will be returned to the location in section B of address memory 53 reserved for the particular one of the input-output units 32. This address stored in the word location in section B of address memory 53 will again be returned to address register 37 only when the next data character transmitted by the particular one of the input-output units 32 is received by input-output control unit 27 and is ready for storage in memory 11. Thus successive characters from the particular input-output unit associated with a multi-line control unit may be stored in adjacent locations within memory 11 despite the fact that other characters from other input-output units associated with the same multi-line control unit may be stored in memory 11 intermediate the storage of characters from the particular input-output unit.

Figure 2:
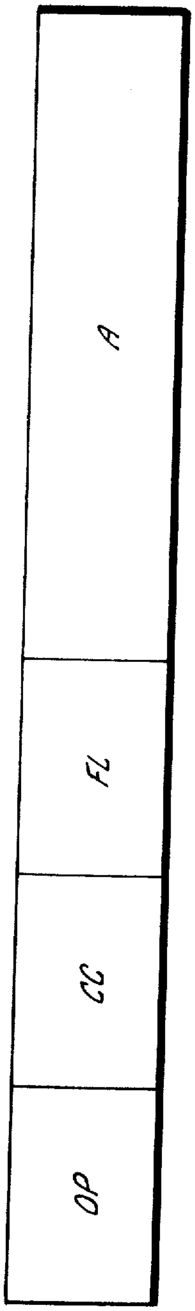
FIG. 2 depicts the format of an illustrative "initiate input-output" command utilized by the present invention.

FIG. 2 depicts the format of an illustrative "initiate input-output" command utilized by the present information.

Figure 3:
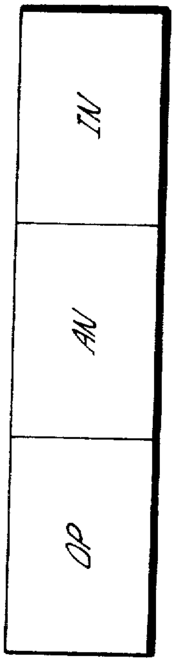
FIG. 3 depicts the format of an illustrative "input-output identity test" command utilized by the present invention.

FIG. 3 depicts the format of an illustrative "input-output identity test" command, the execution of which in accordance with the present invention automatically identifies the particular type of input-output unit with respect to which this command is executed. By so identifying the types of input-output units communicating with the overall system it is possible, as discussed above, to apply proper programmatic test routines to these input-output units whenever it is desirable so to test them.

Figure 4:
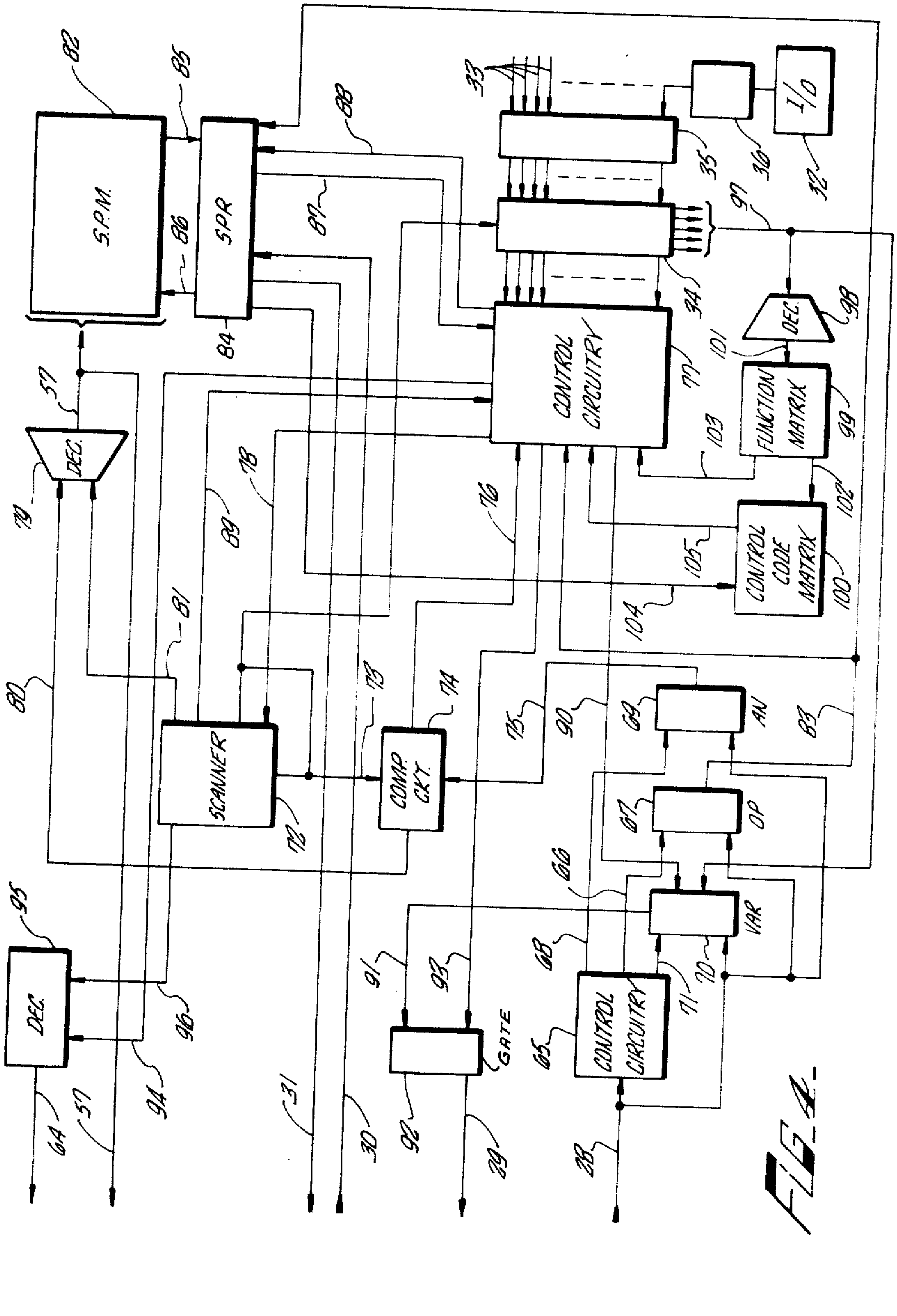
FIG. 4 depicts in greater detail the multi-line input-output control unit shown in FIG. 1.

FIG. 4 depicts in greater detail the multi-line control unit 27 of FIG. 1 and elements common to both FIGS. 1 and 4 share the same reference characters in both figures.

The manner in which the "input-output identity test" command may advantageously be executed will now be described. FIG. 2 depicts an "initiate input-output" command which is utilized to open up a particular one of the input-output channels and to identify the address of an "input-output identity test" command subsequently to be executed. The command shown in FIG. 2 is made up of two syllables, each of which comprises six digits. The first two digits designated OP indicate that an "initiate input-output" command is to be performed. The next two digits designated CC indicate the particular input-output channel which is to be utilized. It will be assumed that these digits indicate that the twentieth input-output channel which is associated with multi-line control unit 27 is to be utilized. The next two digits designated FL indicate the field length of the input-output command which is to be executed. It will be assumed that the field length indicated is one syllable. The second syllable of the "initiate input-output" command depicted in FIG. 2 specifies the address of the input-output command which is subsequently to be executed.

Initially the Next Instruction Address register 49 will contain the address of the first digit of the OP digits shown in FIG. 2. This address will be transferred from register 49 to address register 37. When a processor memory access is granted by central control unit 12, the two OP digits will be read out of memory 11 and transferred to processor control circuitry 44. The address stored in register 37 will then be increased by two and stored into a location in section A of address memory 53 reserved for the processor. When a processor memory access is again granted, this address will be read out of address memory and the CC digits of the command shown in FIG. 2 will be read out of memory 11. In like manner the two FL digits will subsequently be read out of memory 11 and the six digits making up the A address of the command shown in FIG. 2 will also be read out of memory 11. At this time the "initiate input-output" command shown in FIG. 2 has been fully fetched from memory 11.

Circuitry 44 then indicates to central control unit 12 via line 47 that an input-output command is to be performed and that the twentieth input-output channel is to be utilized. At this time the six digits making up the A address of the command shown in FIG. 2 are stored in a location in section A of address memory 53 which is reserved for the processor.

In the operation just described processor 10 has fetched and executed the "initiate input-output" command depicted in FIG. 2. During the fetch of this command it transferred the command from memory 11 to processor control circuitry 44. During the execution of the command it transferred to central control unit 12 via line 47 the two CC digits of the command which designate the particular input-output channel to be utilized during a succeeding input-output command. Additionally, it inserted the address A of the command shown in FIG. 2, which is the address of the input-output command depicted in FIG. 3, into a location in section A of address memory 53 which is reserved for the processor.

During succeeding memory cycles which are allocated to the processor it will fetch the input-output command depicted in FIG. 3. During the first memory cycle of this fetch operation the two OP digits are fetched from memory 11, transmitted via register 39 and line 42 to the central control unit 12 and thence transmitted via line 28 of the nineteenth input-output channel to the multi-line control unit 27. As depicted in FIG. 4, the two OP digits received by control unit 27 over line 28 are directed by control circuitry 65 and line 66 to register 67. During the succeeding memory cycle allocated to the processor, the next two digits of the command depicted in FIG. 3, the AN digits, are transmitted to multi-line control unit 27 and directed by control circuitry 65 and line 68 to register 69. Similarly, during the next memory cycle allocated to the processor the remaining two digits, the IN digits of the command shown in FIG. 3, will be transmitted to multi-line control unit 27 and directed to register 70 by control circuitry 65 and line 71. Processor control circuitry 44 then notifies central control unit 12 via a signal transmitted on line 47 that the fetch of the command depicted in FIG. 3 has been completed. At this time execution of the command depicted in FIG. 3 is turned over to multi-line control unit 27 and the processor is free to perform other functions.

The OP digits of the input-output command of FIG. 3 indicate that the operation to be performed is an "input-output identity test" operation whereby a particular input-output unit is identified as to its type and this information is transmitted to memory 11. The AN digits of the command specify the particular data communication line with respect to which the identity test is to be made whenever the input-output channel previously identified is associated with a multi-line input-output control unit. It will be assumed that the AN digits of the command specify that the data is to be transmitted by the first one of the input-output units 32. The two digits of the command designated as the IN digits constitute variant digits which under certain circumstances may effect changes in either the OP or AN digits. For purposes of the present discussion the variant digits will not be utilized.

Scanner 72 depicted in FIG. 4 sequentially presents signals on thirty-six output lines 73, shown as a single line for purposes of illustrative clarity, which are associated with the thirty-six line adapters 34. Compare circuit 74 is connected to scanner 72 by the lines 73 and is connected to register 69 by line 75. After execution of the command of FIG. 3 has been turned over to the multi-line control unit 27, scanner 72 sequentially scans the thirty-six line adapters until it scans that adapter which is identified by the contents of register 69. At this time, compare circuitry 74 recognizes that the scanner 72 is pointing at the adapter identified by the contents of register 69. When this comparison is made, a signal on line 76 from compare circuit 74 notifies control circuitry 77 that there has been a comparison and control circuitry 77, via line 78, in turn causes the scanner 72 to stop at this position.

At this time signals from compare circuit 74 and scanner 72 are applied to decoder 79 via lines 80 and 81 respectively. Decoder 79 decodes the signals on line 81 into a signal on one of thirty-six output lines 57. These lines 57 are used to address thirty-six word locations contained in scratchpad memory 82 and to address the word locations reserved in section B of address memory 53 for the thirty-six input-output units 32. Scratchpad memory 82 may be advantageously be identical in structure to address memory 53. The word locations in scratchpad memory 82 are related respectively to ones of the thirty-six line adapters 34. The comparison detected by circuitry 74 causes the contents of register 67, the OP digits, to be transferred via line 83 to control circuitry 77 and to scratchpad register 84. The scratchpad memory 82 has a word location reserved therein for each of the data communication lines 33. As scanner 72 stops at a particular one of the line adapters the word in memory 82 reserved for the data communication line associated with the adapter is read into register 84 via line 85 and written back into memory 82 via line 86 when scanner 72 resumes scanning.

Lines 87 and 88 connect register 84 and control circuitry 77 and line 89 connects scanner 72 to control circuitry 77.

As described in greater detail in the copending application of James Russell Bennett referred to previously, the fetch and execution of an input-output command which calls for the transmission of data between memory 11 and one of the input-output units 32 will initially effect the insertion of a channel descriptor word in register 70 from control circuitry 77 via line 90 and will subsequently cause this channel descriptor word to be transferred to central control unit 12 via line 29 by means of line 91 and gating circuitry 92 in response to a signal applied to line 93 from control circuitry 77. Upon receiving such a channel descriptor word from multi-line control unit 27 over line 29 the central control unit 12 inserts into address register 37 via line 63 an address in memory 11 reserved for channel descriptor words from multi-line control unit 27. Central control unit 12 then transmits the descriptor word received over line 29 into this address in memory 11 via line 43 and register 39. Multi-line control unit 27 then proceeds to execute the command and controls the transmission of data characters. When the last character of such transmission has been received, control circuit 77 recognizes that the transmission is complete and presents a signal via line 94 to descriptor address decoder 95. Line 96 connects scanner 72 with decoder 95. Decoder 95 is then utilized to insert an address in address register 37 via line 64 which address is reserved for result descriptor words associated with the particular data communication line over which transmission has been occurring. Control circuitry 77 then inserts such a result descriptor word in register 70 and causes it to be transmitted via line 29 to control unit 12. It then is stored in memory 11 at an address designated by the signals transmitted over line 64. This result descriptor word would indicate that execution of such a data transmission type command has been completed. As described further in the aforesaid copending application of James Russell Bennett adapter identification bus 97, decoder 98, function parameter matrix 99, and control code matrix 100 are utilized in conjunction with execution of such a data transmission type of input-output command. Decoder 98 presents a signal to function matrix 99 on lines 101 and matrix 99 in turn presents signals to matrix 100 on lines 102 and to control circuitry 77 on lines 103. A data character about to be transmitted is presented to control matrix 100 from register 84 on lines 104 and matrix 100 recognizes control code characters and presents signals to control circuitry 77 on lines 105 in response to such recognition.

Execution of the input-output identity test command in accordance with the present invention may advantageously be effected solely by the transmission of a channel result descriptor word from register 70 to central control unit 12 via line 29. This results since execution of this particular command does not require the transmission of any data over data communication lines 33 between the memory 11 and any of the input-output units 32. Whereas such channel descriptor words, when utilized in conjunction with execution of data transmission type commands, indicate merely that the command has been completely fetched, that its execution may be turned over to the selected control unit and that a particular input-output channel is again free; in accordance with the teaching of the present invention, it additionally identifies the type of input-output unit associated with a selected data communication line.

As described in the aforesaid copending application of James Russell Bennett, signals on the adapter information bus 97 which are transmitted to decoder 98 identify the type of input-output units associated with whichever one of the data communication lines 33 scanner 72 is pointing at. The adapter identification bus 97 may advantageously comprise five lines thereby being capable of identifying thirty-two types of input-output units. The matter of deriving the identification of the type of input/output unit is shown in more detail in FIG. 5 of the aforementioned application 626,013. Each adapter provides a five-bit pattern which uniquely identifies the type of adapter and, therefore, the type of input-output unit associated with the adapter. These five bits are selectively coupled to the information bus 97 in response to the scanner 72. As pointed out above, the scanner 72 is arranged to stop scanning when it is pointing to the adapter identified by the contents of the register 69. Each line 73 from the scanner activates an associated set of five gates. Thus the identification bits from one adapter at a time are applied to the bus 97.

In accordance with the present invention adapter identification bus 97 additionally presents these binary signals to register 70. These signals may be used in addition to those presented via line 90 from control circuitry 77 to form the channel descriptor word transmitted to central control unit 12 via line 29 and thereafter stored in a particular channel result descriptor location in memory 11.

Consequently when an input-output identity test command is transmitted to multi-line input-output control 27 for purposes of execution, the requested information is immediately returned to memory 11 within the channel result descriptor word returned to memory 11. No further execution of this command within multi-line input-output control unit is required. Thus, a tremendous saving in time over any manual insertion of this information into memory 11 is achieved and the entire operation is completed with relatively few memory accesses being required. Additionally, execution of this command is handled with considerably greater accuracy than could ever be achieved by the manual insertion of such information into memory 11.

Figure 5:
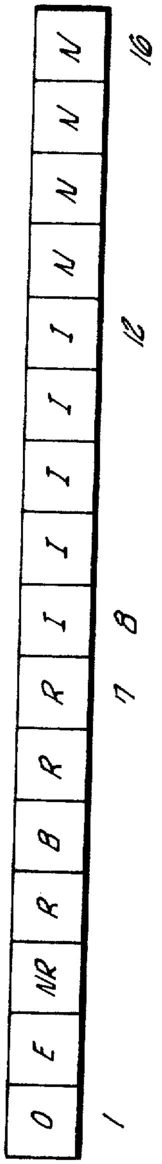
FIG. 5 depicts the format of an illustrative result descriptor word which is provided during the operation of the present invention.

FIG. 5 depicts the format of an illustrative result descriptor word which may be utilized by the system depicted in FIG. 1 and which may be provided during the operation of the present invention. FIG. 5 depicts a sixteen-bit channel result descriptor word, only several bits of which need be utilized for the "input-output identity test" operation. The first bit, for example, may indicate whether an operation is complete. The second bit may indicate whether an exception condition exists. The third bit may manifest a "not ready" condition. The fourth bit may be reserved. The fifth bit may denote whether an adapter is busy. The sixth and seventh bits may be reserved. The eighth through twelfth bits may indicate the type of input-output unit present on a selected line, while the thirteenth through sixteenth may denote a unit number. Such a channel result descriptor format is quite general and can be used in conjunction with a great multiplicity of operations performable by the computer system depicted in FIG. 1. Bits 8 through 12 for example of this result descriptor format may advantageously be utilized to present in binary form the particular type of input-output unit associated with a selected line. Binary information in these five bit locations may be received directly from adapter identification bus 97 which in one embodiment comprises five lines presenting these five signals.

The information in such channel result descriptor word apart from the five bits identifying the type of input-output units associated with the selected data communication line are presented to register 70 on line 90 by control circuitry 77. These signals are presented on line 90 by control circuitry 77. They are presented, in part, in response to signals presented to circuitry 77 on line 87 from the word in scratchpad memory 82 associated with the selected data communication line, this word having been read into register 84 at the time the "input-output identity test" command was received. Additional standard type registers within control circuitry 77 may be utilized to transmit the remaining information necessary for the formation of the result descriptor word.

Although the present invention has been described in conjunction with a multi-line input-output control unit it may also be utilized in conjunction with a control unit of the single line variety. A line adapter associated with such single line input-output control unit may be similarly utilized to provide identification signals which are then utilized to assemble a result descriptor word which, in part, identifies the type of input-output unit associated with the selected control unit.

Upon the receipt of the result descriptor word in memory 11 at an address reserved for such channel descriptor words, software associated with the system may advantageously be used to move the "adapter-type" information received in the result descriptor word to a new location reserved for such information. Prior to any subsequent programmatic test routines applied to any particular input-output unit, the software may then conveniently look to this reserved location in order to determine the particular test routine which should be employed. If for example it were desired to store at a table location in memory 11, information depiciting the types of input-output units associated with each of the thirty-six data communication lines 33 associated with the multi-line control unit 27, the software simply could repeat thirty-six times its generation of the "initiate input-output" command depicted in FIG. 2. After each execution of the "input-output identity test" command it could, for example, increase by one the data communication line identified by the AN digits in the command depicted in FIG. 3. Thus it could easily scan each of the thirty-six data communication lines and transfer to thirty-six reserved digital locations in memory 11 the thirty-six result descriptor words returned by input-output control unit 27 in response to the repeated execution of this command.

All of the circuits shown in the accompanying drawing in block diagram form are of a type well known to persons skilled in the art. All of the circuits designated as control circuits, for example, comprises well-known logic circuitry which may easily be designed to perform the functions specified for these circuits.

What has been described is considered to be only an illustrative embodiment of the present invention and, accordingly, it is to be understood that various and numerous other arrangements may be devised by one skilled in the art without departing from the spirit and scope of this invention.

What is claimed is:

1. A digital data transmitting system comprising:
a main memory for storing data and commands;
a processor including a register for reading out successive commands from main memory into the register and initiating operations in response to each type of command;
a plurality of input/output units of different types;
a control unit;
a plurality of adapter units for coupling the input/output units to the control unit, there being a different adapter unit for each type of input/output unit, each adapter unit generating a coded output signal identifying the type of input/output unit associated with that adapter;
means responsive to a predetermined command in said register for transferring a control word from the main memory to the control unit, said control word including a portion identifying a particular one of said adapters; and
means responsive to the control word for transferring the coded output signal from the particular adapter identified by the control word to the main memory.

2. Apparatus as defined in claim 1 further including an address decoding means;
means responsive to said portion of the control word identifying one of said adapters for generating a unique address for each adapter identified; and
means responsive to the output of said decoding means for addressing the main memory, whereby the coded output signal from each adapter is transferred to a predetermined address in main memory.

References Cited

UNITED STATES PATENTS

| | | | |
|---|---|---|---|
| 3,200,380 | 8/1965 | MacDonald et al. | 340—172.5 |
| 3,331,055 | 7/1967 | Betz et al. | 340—172.5 |
| 3,377,619 | 4/1968 | Marsh et al. | 340—172.5 |
| 3,390,379 | 6/1968 | Carlson et al. | 340—172.5 |
| 3,407,387 | 10/1968 | Looschen et al. | 340—172.5 |

PAUL J. HENON, Primary Examiner

H. E. SPRINGBORN, Assistant Examiner